United States Patent
Steeger

(10) Patent No.: US 9,435,464 B2
(45) Date of Patent: Sep. 6, 2016

(54) LINE GUIDE MADE OF MULTI-AXIALLY ANGLE-ADJUSTABLE LINKS

(71) Applicant: igus GmbH, Cologne (DE)

(72) Inventor: Ralf Steeger, Lohmar (DE)

(73) Assignee: igus GmbH, Cologne (DE)

( * ) Notice: Subject to any disclaimer, the term of this patent is extended or adjusted under 35 U.S.C. 154(b) by 0 days.

(21) Appl. No.: 14/782,425

(22) PCT Filed: Mar. 24, 2014

(86) PCT No.: PCT/EP2014/055798
§ 371 (c)(1),
(2) Date: Oct. 5, 2015

(87) PCT Pub. No.: WO2014/161734
PCT Pub. Date: Oct. 9, 2014

(65) Prior Publication Data
US 2016/0040803 A1 Feb. 11, 2016

(30) Foreign Application Priority Data

Apr. 5, 2013 (DE) .................... 20 2013 101 460 U

(51) Int. Cl.
*F16L 3/00* (2006.01)
*F16L 3/015* (2006.01)
(Continued)

(52) U.S. Cl.
CPC ............... *F16L 3/015* (2013.01); *F16C 11/06* (2013.01); *F16G 13/16* (2013.01); *F16L 3/1075* (2013.01); *F16L 3/26* (2013.01); *H02G 3/0475* (2013.01)

(58) Field of Classification Search
CPC .... H02G 11/006; F16G 13/16; F16L 3/1075; F16L 3/26; Y10T 74/20462
See application file for complete search history.

(56) References Cited

U.S. PATENT DOCUMENTS 4,384,594 A * 5/1983 Moritz ................. H02G 11/006
138/120
6,773,297 B2 8/2004 Komiya
(Continued)

FOREIGN PATENT DOCUMENTS

DE 19948926 A1 6/2000
DE 102010037751 A1 3/2012
(Continued)

OTHER PUBLICATIONS

English PCT International Search Report mailed Jul. 4, 2014, received in corresponding PCT Application No. PCT/EP14/55798, 2 pgs.
(Continued)

*Primary Examiner* — Amy Sterling
(74) *Attorney, Agent, or Firm* — Grossman Tucker Perreault & Pfleger, PLLC

(57) ABSTRACT

The invention relates to a cable guide (1) comprising links (2) that are each angle-adjustable multi-axially relative to each other and connected to each other in articulated fashion, where each link (2) displays an inner part (3) with corresponding, multi-axially angle-adjustable, articulated connectors (5, 6) and a casing part (4) for peripheral delimitation of at least one guiding duct (7), and the casing part (4) encompasses at least one segment (10), which is connected to the inner part (3) by a web (20), in a manner permitting it to be pivoted open for accessing the associated guiding duct (7) on the peripheral side. To facilitate the insertion and removal of lines, and to increase their protection, it is proposed that the casing parts (4) of adjacent links (2) overlap in the longitudinal direction (L), and that a joint arrangement (30) having at least two degrees of freedom be provided between the at least one segment (10) and the web (20), by means of which the segment (10) is mounted in such a way that it can move outwards transversely to the longitudinal direction (L) while being pivoted open.

15 Claims, 3 Drawing Sheets

Figure 1A:
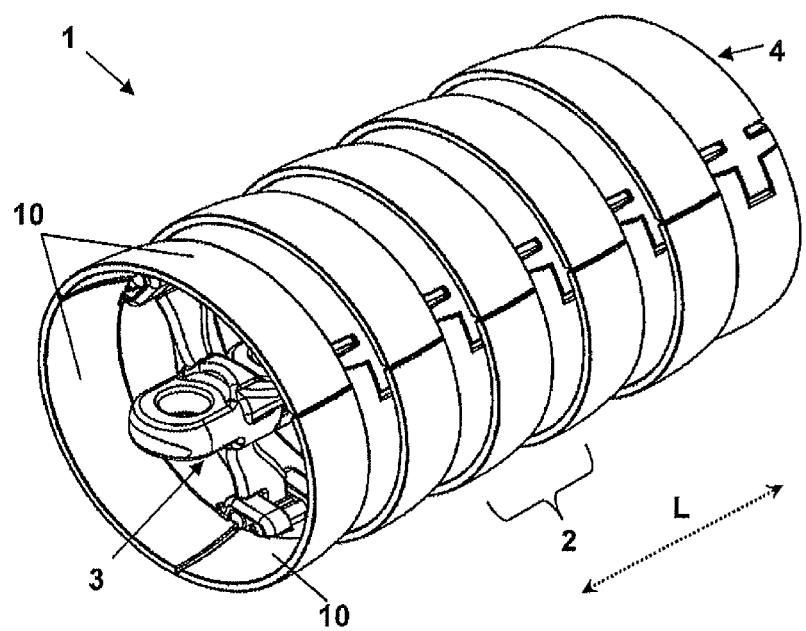

(51) Int. Cl.
*F16G 13/16* (2006.01)
*H02G 3/04* (2006.01)
*F16C 11/06* (2006.01)
*F16L 3/10* (2006.01)
*F16L 3/26* (2006.01)

(56) References Cited

U.S. PATENT DOCUMENTS

| | | |
|---|---|---|
| 7,439,446 B2 | 10/2008 | Blase et al. |
| 8,266,882 B2 | 9/2012 | Hermey et al. |
| 8,459,000 B2 * | 6/2013 | Harada ................ H02G 11/006 248/51 |
| 8,505,272 B1 * | 8/2013 | Komiya ............... H02G 11/006 248/49 |
| 2003/0026647 A1 * | 2/2003 | Sasaki .................. H02G 15/013 403/288 |
| 2003/0083550 A1 * | 5/2003 | Miyagi ................ A61B 1/0055 600/141 |

FOREIGN PATENT DOCUMENTS

| | | |
|---|---|---|
| WO | 2012013497 A3 | 2/2012 |
| WO | 2013124370 A3 | 8/2013 |

OTHER PUBLICATIONS

PCT International Preliminary Report on Patentability with English translation of Written Opinion, issued on Oct. 6, 2015, received in corresponding PCT Application No. PCT/EP14/55798, 8 pgs.

\* cited by examiner

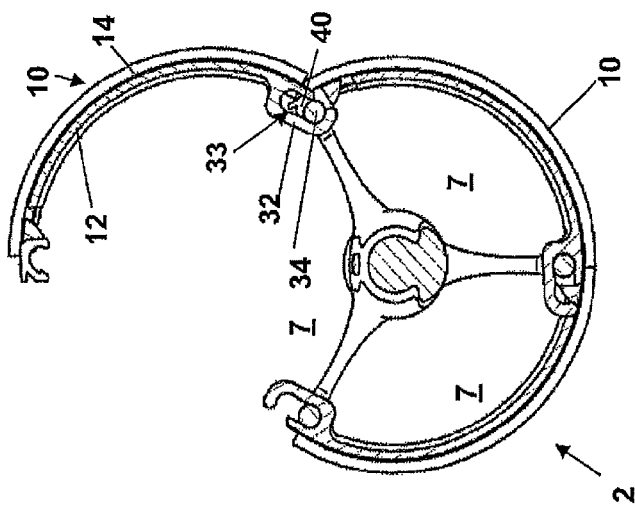
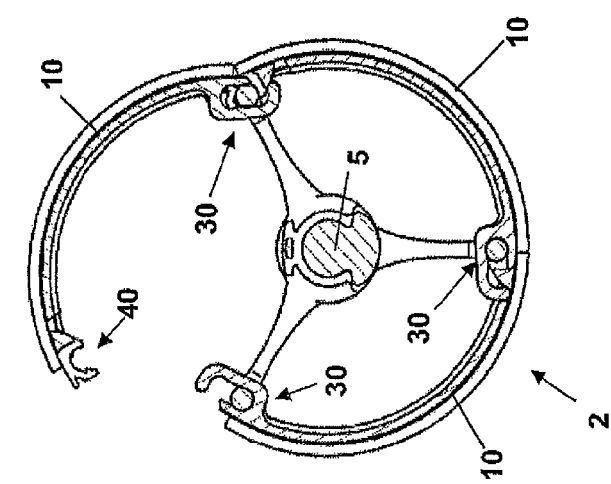
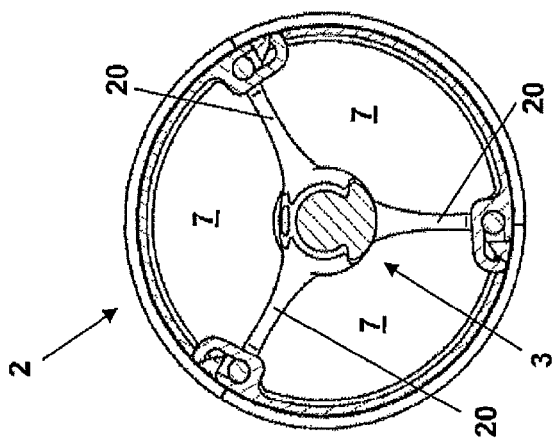

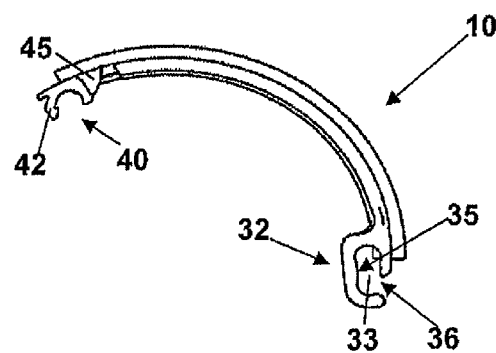
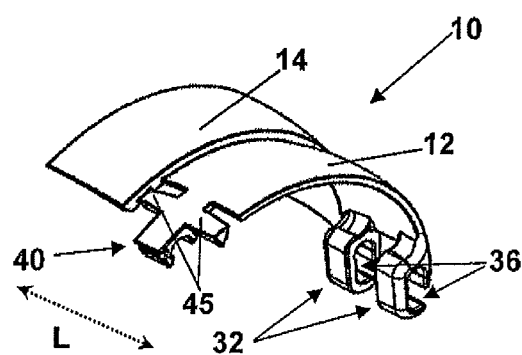
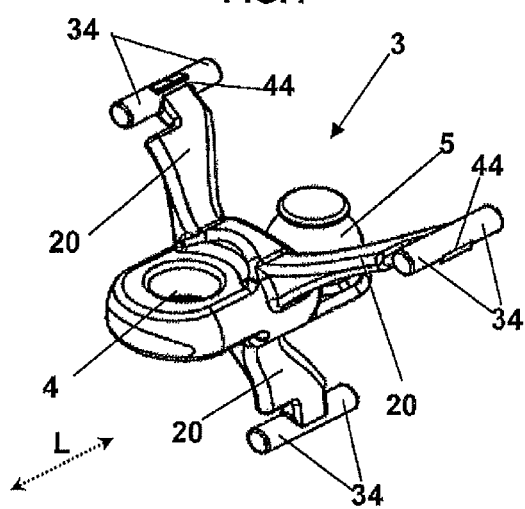

LINE GUIDE MADE OF MULTI-AXIALLY ANGLE-ADJUSTABLE LINKS

The invention generally relates to a cable guide (also called cable carrier or line guide) for guiding and protecting cables, hoses and the like. It specifically relates to a cable guide comprising links that are respectively angle-adjustable multiaxially relative to each other, connected to each other in articulated fashion and arranged successively in the longitudinal direction of the cable guide. In a generic cable guide, each link displays an inner part with corresponding articulating connectors and a casing part for peripheral delimitation of at least one guiding duct. In this context, the articulated connectors permit multiaxial, e.g. three-dimensional, angling or pivoting of the links relative to each other. The casing part encompasses at least one segment, which is connected to the inner part by a web, in a manner permitting it to be pivoted open in order to make an associated guiding duct accessible on the peripheral side or from the outside.

A cable guide of this kind is known from utility model specification DE 20 2012 001 760 U1. Compared to the cable guide known from international patent application WO 2004/093279, it has the advantage that insertion or removal of the cables or other lines is simplified in that the pivoting open of individual segments of the casing parts gives access to the guiding ducts located on the inside. Due to the design, and particularly owing to the segments that can be pivoted open, the casing parts are arranged successively at a distance from each other in the longitudinal direction and accordingly have a relatively small longitudinal dimension in relation to the chain links. Consequently, the protective function of the casing, e.g. against chips, sparks and the like, leaves somewhat to be desired in certain applications.

A further, three-dimensionally deflectable cable guide is known from DE 10 2010 032 920. Like the energy guiding chain from DE 20 2012 001 760 U1, it offers no closed jacketing of the lines, and thus only little protection of the lines against exposure to external influences.

In this respect, the guiding device according to WO 2004/093279 has the advantage that the links proposed there can form a jacketed flexible conduit that displays an essentially closed casing over the full periphery and over the entire length. This achieves greater protection of the guided lines, cables, hoses, etc. This is desirable on many industrial machines, e.g. on metal-cutting machines or on a welding robot. In the cable guide from WO 2004/093279, the casing parts of the links are provided with slit-shaped openings for insertion or removal of the lines. However, the insertion and removal of lines through openings of this kind is inconvenient in practice. Moreover, the openings reduce the protection of the guided cables to a certain extent.

The object of the present invention is therefore to propose a cable guide that facilitates the insertion and removal of lines and, at the same time, offers greater protection of the guided lines.

In a cable guide according to the generic part of claim 1, this object is already solved by the fact that the casing parts of adjacent links at least partially overlap in the longitudinal direction and that, at the same time, a joint arrangement with at least two degrees of freedom is provided between at least one segment of the casing part and one web of the inner part. According to the invention, the joint arrangement is designed in such a way that the segment can also move outwards transversely to the longitudinal direction while being pivoted open. The joint arrangement permits the segment, especially its end facing towards the web, a further, outward-oriented direction of movement, independently of, or in addition to, the pivoting movement, as a result of which the segment can be pivoted open past an adjacent segment, particularly in the area of the overlap.

The proposed joint arrangement thus makes it possible for the casing parts of adjacent links to overlap over the greatest possible longitudinal section and, at the same time, for the casing parts to be capable of being pivoted open, at least in areas or segments.

It should be noted that, in principle, a casing closed over the entire periphery could easily be designed to pivot open by means of a pivot located on the outside. However, locating joint components on the outside of the casing parts would result in projecting parts on the outer surface, this being undesirable. Moreover, the joint arrangement would be exposed to external influences, these being precisely what protection is to be afforded against. Consequently, a preferred embodiment provides for the joint arrangement to be located entirely on the inside in relation to the casing part, specifically in such a way that the joint arrangement is protected in closed state.

Access can be gained peripherally or via the periphery of the casing or the casing part, where the guiding duct associated with the respective casing part can be accessed essentially radially.

It should also be noted that a distinction must be made between the joint arrangement for pivoting open areas or segments of the casing parts, and the multi-axially angle-adjustable articulated connection between the links. In the present case, angle-adjustable multi-axially means mobility of the links relative to each other about at least two independent axes. It may in particular but not necessarily mean three-dimensional mobility through a ball-and-socket joint.

In a preferred embodiment, the joint arrangement is designed as a combination of two joints, particularly two different and spatially separate joint types. A design involving a multiple joint with coinciding joints is, however, also theoretically conceivable.

The joint arrangement is preferably designed as a rotary and curved guide, e.g. as a link guide with rotary engagement, with a curve direction lying essentially transversely to the axis of rotation. In this context, the axis of rotation can expediently be essentially parallel to the longitudinal direction of the cable guide or to the routing direction. The curving movement enabled must not necessarily be translatory, but can also have a curved shape, e.g. based on the cross-section or contour of the segments. As an alternative to the preferred design as a rotary and curved guide, other joint arrangements are also suitable that enable outward movement of the segment. Also open to consideration is, for example, a double hinge joint realised by parallel film hinges. Likewise suitable would be, for example, an articulated bracket joint, a joint in the manner of a concealed hinge or a door joint hinge, or another joint combination that also permits a further movement, in addition to the pure opening rotation of the segment, e.g. in a radially outward direction.

A rotary and curved guide can, however, be realised in simple and robust fashion, particularly by injection moulding, if provision is made for two claw-shaped hinge brackets to project from one end of the segment, and corresponding joint areas, designed as journals, are provided on the web and reached around by the joint brackets in rotating fashion. In this context, the claw-shaped joint brackets on the segment form a slot-like linear or curved guide for the curving movement of the rotary and curved guide. The joint areas on the web are designed in the manner of journals and adapted to the guide in the joint brackets. They project essentially axially on the web, preferably parallel to the longitudinal direction of the cable guide.

In a rotary and curved guide of this kind, a development provides for the slot-like guide of the joint brackets to run essentially in the peripheral direction of the casing part, thus enabling the segment to be easily pulled out quasi-radially in the course of the opening movement. A constriction is preferably provided between the two end areas of the guide, such that the rotary and curved guide can lock into place in a first, closed end position and a second, opened end position.

A development of the cable guide permits stable connection of the casing part to the inner part, in that a snap-in projection that engages the peripherally nearest web of the link is provided on the end of the segment lying opposite the joint arrangement. In this way, reliable fastening of the segment on the inner part can be realised by the joint arrangement at the one end and by the snap-in connection at the other end. To this end, the snap-in projection preferably displays a snap-in hook that interacts with a snap-in edge on the web. In an expedient development, provision is made for the snap-in projection to reach into a gap between the two joint brackets of the peripherally nearest web. This ensures optimum utilisation of the space available in the longitudinal direction for connection to the inner part. To improve the protective effect, and also to protect the joint arrangement, the snap-in projection is moreover preferably designed in such a way that it closes the gap between the two joint brackets.

For detaching the segment from the web, provision is expediently made for the joint arrangement, particularly each of the two joint brackets, to display one or more outward-facing openings that enable the segment to be detached from the web. To increase the protection of the guided cables and the joint arrangement against exposure to external influences, provision is moreover expediently made in this embodiment for the end of the segment lying opposite the joint arrangement to have one or more projections that are designed in such a way that, when in closed position, they cover the one or more openings of the peripherally nearest segment in the area of the joint arrangement. The openings are expediently provided in the end area of the slot-like guide that reaches around the journals in the opened end position of the segment. This ensures that the segments can easily be detached from the webs in opened position, but not in completely closed position.

In an embodiment preferred for protecting the guided cables, each segment is divided into two spherical cap areas in the longitudinal direction. In this context, a first cap area displays a centre point of the sphere that essentially coincides with the centre of a ball-and-socket type joint element on the inner part. The second cap area is designed in such a way that it can at least partially accommodate the first cap area of an adjacent link. In this context, the joint arrangement according to the invention, particularly the rotary and curved guide, is expediently provided exclusively over the longitudinal dimension of the first cap area, between the first cap area and the web. This form permits maximum overlapping between the first and second cap areas in all angled positions of adjacent links, since the second cap area is free of joint components and can thus reach completely over an adjacent first cap area.

Especially with a cap-shaped design of the casing parts, it is particularly expedient if every casing part displays several, particularly three, identical segments, produced in one piece, and webs, e.g. three webs, are accordingly integrally moulded on the inner part in one piece in a rotationally symmetrical arrangement for each segment, particularly on the middle longitudinal section of the inner part. To ensure extensive overlapping of the casing parts and, at the same time, stable connection to the inner parts, it is particularly expedient in this context if the webs extend not only radially outwards, but also with one component in the longitudinal direction of the cable guide. This at the same time ensures that the outer end area of the web lies opposite the first cap area of the associated segment.

A robust joint arrangement can particularly be realised in that parts of the joint arrangement, particularly joint areas designed as journals, are integrally moulded on the outer end of each segment in such a way that their effective length extends essentially over the entire longitudinal dimension of the first cap area. For instance, a maximum design length of the pivot bearing component of the rotary and curved guide in the longitudinal direction can be ensured in this way, without impairing the overlapping of the cap areas.

In an expedient embodiment, the cable guide has links in which the casing part is made up of several, preferably three, identical segments. Each segment is preferably manufactured in one piece. Expediently, each segment can moreover be pivoted open separately and is designed in such a way that, when the segments are closed, the casing parts of adjacent links reach over each other in all angled positions of the links relative to each other and also essentially over the entire periphery. This achieves the best possible protective effect, in that the casing parts form a protective tube that is closed over the entire length of the cable guide, surrounding and protecting the guiding ducts inside and the lines, hoses or the like located therein.

Provision is moreover expediently made for the inner part of each link to display corresponding articulating connectors of the cardan or ball-and-socket joint type. Articulated connectors of this kind are, on the one hand, suitable for multiaxially, particularly three-dimensionally angling connection and, on the other hand, also permit the absorption of tensile forces between the links of the cable guide. The inner part can be manufactured in one piece with the webs, such that, in a preferred design, each link is assembled from a total of four individual parts.

Figure 1B:
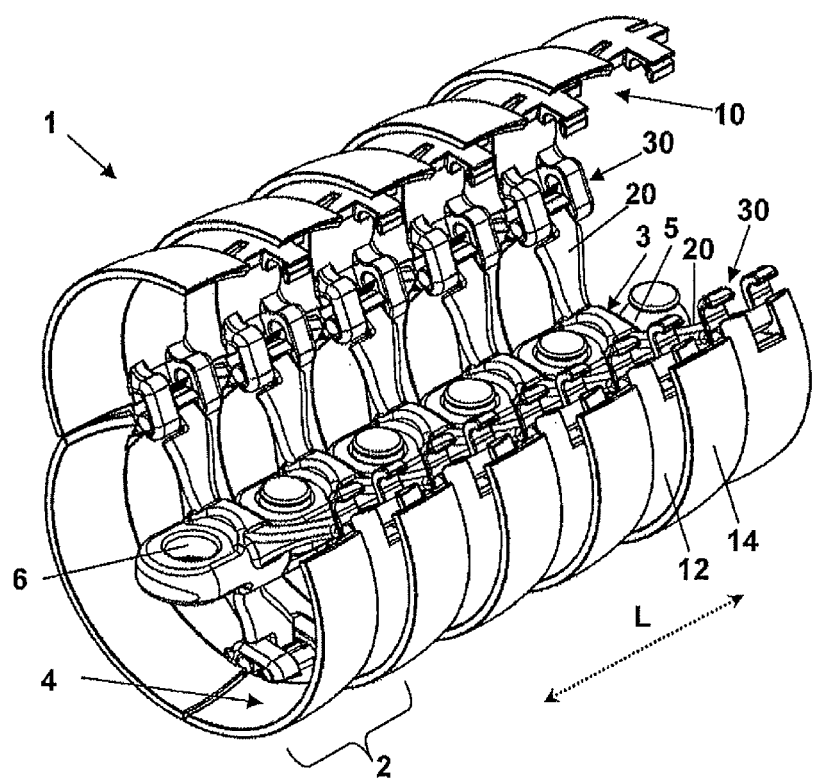

Further advantages and features of the invention are described in more detail below on the basis of the Figures. The Figures show the following:

FIGS. 1A-1B: Perspective views of a section of a preferred practical example of the cable guide according to the invention, with completely closed casing parts (FIG. 1A) and with opened segments of the casing parts (FIG. 1B);

FIGS. 2A-2C: Cross-sections transverse to the longitudinal direction of the cable guide, with completely closed segments (FIG. 2A), with a partly opened segment (FIG. 2B) and with a completely opened segment (FIG. 2C);

FIGS. 3A-3B: A front view and a perspective view of a segment of the cable guide according to FIGS. 1A-1B;

FIG. 4: A perspective view of the inner part of a link of the cable guide from FIGS. 1A-1B.

A preferred embodiment of the cable guide according to the invention is generally referred to as 1 in FIGS. 1A-1B. Cable guide 1 serves as an energy guiding chain for cables, hoses or the like, and consists of a plurality of links 2, connected to each other in articulated fashion. Each link 2 is very largely open on both face ends and displays a rotationally symmetrical outer contour in closed state. In this context, each link 2 consists of an inner part 3, produced in one piece by injection moulding, and a three-piece casing part 4 surrounding inner part 3. Provided on inner part 3 and lying opposite each other in longitudinal direction L are the ball 5 of a ball-and-socket joint and a correspondingly shaped socket 6 of a ball-and-socket joint, such that links 2 are connected to each other by ball-and-socket joints and can thus move in virtually every direction relative to each other. In the context of the invention, even angling about just two transverse axes is to be interpreted as multiaxial. Articulating connectors 5, 6 are designed to be detachable and to absorb tensile forces. Further details of suitable articulated joints will not be described in more detail, since their principle is already known from WO 2004/093279.

Cable guide 1 becomes three-dimensionally movable as a result of ball-and-socket joints 5, 6. Thus, cable guide 1 can particularly be used to supply the end effector on a multiaxial industrial robot (not shown), e.g. to supply the welding head on a 6-axis welding robot. Cable guide 1 is preferably designed entirely in the manner illustrated in FIGS. 1A-1B between the stationary connection and the moving connection to be supplied (not shown). Three-dimensionally movable links 2 can also be present only in some sections.

As can best be seen from FIG. 1A, the casing parts 4 of the individual links 2 form, in closed state, a protective tube around guiding ducts 7 inside that is essentially closed over the entire periphery (FIG. 2A). As a result of the overlapping of casing parts 4 in longitudinal direction L, cable guide 1 is additionally very largely closed over the entire length. Consequently, casing parts 4 of links 2 form a virtually closed protective jacket for the cables, hoses and the like to be guided.

Each casing part 4 demarcates guiding ducts 7 on the periphery and, in the preferred practical example, comprises three identically manufactured segments 10, which are shown in more detail in FIGS. 3A-3B. Segments 10 are manufactured from plastic in one piece by injection moulding and have a roughly sector-like shape. As can be seen in more detail from FIG. 3B, segments 10 are subdivided in longitudinal direction L into a first cap area 12 and a second cap area 14. First cap area 12 has roughly the form of a sector of a spherical annulus, whose centre point essentially coincides with the centre of ball 5 of the ball-and-socket joint of inner part 3 in closed state (FIG. 1A). Adjacent to it, second cap area 14 has a centre point that is displaced in longitudinal direction L and a larger radius of curvature, such that it can accommodate and cover a corresponding first cap area 12 of an adjacent link 2. In this way, cap areas 12, 14 achieve the desired overlapping (FIG. 1A), without impairing the flexibility of links 2.

As can best be seen from FIGS. 2A-2C, a joint arrangement 30 is provided between each of the three webs 20 of inner part 3 and each of segments 10, by means of which segments 10 are mounted on inner part 3 in movable fashion and can be pivoted open outwards (FIGS. 2B-2C). As a result, access to any of guiding ducts 7 can optionally be created by pivoting open a series of segments 10 (FIG. 1B).

Access is gained peripherally or via the periphery of the casing or casing part 4, in that guiding duct 7 associated with the respective casing part 4 can be accessed essentially radially.

In the practical example shown, joint arrangement 30 between each segment 10 and each web 20 offers two degrees of freedom, namely rotary movement about an axis perpendicular to the plane of FIGS. 2A-2C and a shifting or sliding movement of segment 10 along a curve within this plane, transverse to longitudinal direction L. As a comparison of FIG. 2B and FIG. 2C shows, joint arrangement 30 is designed in such a way that, when being pivoted open by its inner end, segment 10 can be pivoted outwards quasi-radially past an adjacent segment 10. This makes it possible to pivot open closed casing parts 4, and also to prevent trapping and jamming of overlapping cap areas 12, 14, as shown in more detail in FIG. 2C.

In closed state, each joint arrangement 30 is located on the inside on the corresponding segment 10 and is thus largely protected by casing part 4. In a planar view, each joint arrangement 30 according to FIGS. 2A-2C corresponds to a combination of a pivot and a curved guide, or a link guide with rotary engaging member. As shown by comparing FIG. 3B and FIG. 4, this arrangement is realised by two claw-shaped joint brackets 32 that project in the peripheral direction and are integrally moulded on one end of segment 10, and by corresponding joint areas 34, designed as journals, on the end area of each web 20. Joint areas 34 project essentially parallel to longitudinal direction L, or the routing direction of cable guide 1, in the manner of pins and are in this instance formed by a roughly circular cylindrical transverse pin on web 20. Claw-shaped joint brackets 32 reach around joint areas 34 on the webs in rotating fashion. The two joint brackets 32 are of identical design and arranged in parallel fashion and flush in longitudinal direction L. Joint brackets 32 each form a slot-like guide 33 for joint areas 34. Slot-like guide 33 is essentially oriented in the peripheral direction of the casing part, thus defining the curving movement of rotary and curved guide 30, e.g. according to a straight line or a slight curve oriented in the peripheral direction or tangentially. The axis of rotation of joint brackets 32 about joint areas 34 is roughly parallel to longitudinal direction L, the curve direction of guide 33 being exactly or almost perpendicular to it (in the plane of FIG. 3A). Provided in the middle area of the opening of joint brackets 32 that forms guide 33 is a constriction 35 that interacts with joint areas 34. As a result of constriction 35, joint areas 34 lock into place in the two opposite end positions in guide 33. This means that segments 10 can also be held in place in the open position according to FIG. 1B. Joint areas 34 are, however, freely rotatable in the end areas of guide 33, to permit pivoting open and closed. For pivoting open, guide 33 in joint brackets 32 makes it possible for segment 10 to be held on joint areas 34 and nevertheless to be pivoted open in the area of the overlap in longitudinal direction L, past an adjacent segment 10. As a result, and as shown in FIG. 2C, a segment 10 can be pivoted open past the segment 10 that is adjacent peripherally and in longitudinal direction L, although the axis of rotation defined by joint areas 34 lies within the casing. In particular, cap area 14 of the one segment 10 can be opened outwards past cap area 12 of the segment that is adjacent in longitudinal direction L. Moreover, each joint bracket 32 is provided with an outward-facing opening 36, which serves to detach segment 10 from web 20. Openings 36 lie in the end area of guide 33, which reaches around pin-shaped joint areas 34 in the fully opened end position. Thus, segment 10 can only be detached easily in this position (FIG. 1B). In keeping with the function of joint brackets 32 described above, segments 10 are made of an elastically deformable plastic, possibly of a softer material than inner parts 3.

FIGS. 3A-3B furthermore show a snap-in projection 40 with a snap-in hook 42, integrally moulded on the openable end of segment 10. As FIG. 1A shows, snap-in projection 40 reaches into the gap between the two joint brackets 32 of the peripherally nearest segment 10, and is designed in such a way that it almost completely seals off this gap. Snap-in hook 42 locks on a snap-in edge 44, provided roughly centrally on web 10, more precisely on the cylindrical pin forming joint areas 34. Furthermore, snap-in projection 40 reaches in claw-like fashion around the middle area on web 20 between joint areas 34, as a result of which segments 10 are stably retained on webs 20 in the manner of a positive clamping or clip connection. Integrally moulded on segment 10, transversely to snap-in projection 40 in longitudinal direction L, are two projections 45, which are designed as covers for openings 36 and almost completely seal them off when casing parts 4 are closed.

FIG. 1B shows that joint arrangement 30 is provided exclusively in the longitudinal area between first cap area 12 of segments 10 and web 20, so that the overlap of cap areas 12, 14, on the one hand, and the size of joint arrangement 30 in longitudinal direction L, on the other hand, can be as large as possible, as can be seen from FIGS. 1A-1B.

FIG. 4 shows the inner part 3 of a link 2 with three strut- or spoke-like webs 20, integrally moulded in one piece and in rotationally symmetrical fashion at an angle of arc of 120°, that extend radially outwards from the middle part with articulating connectors 5, 6. Each web 20 serves as a mount for exactly one corresponding segment 10 and, together with this segment 10 and the peripherally nearest web 20, demarcates one of three guiding ducts 7 of cable guide 1. In order to position joint areas 34 opposite first cap area 12, webs 20 run not only radially outwards, but also in curved form with a component in longitudinal direction L. In this way, the effective length in longitudinal direction L of joint areas 34 against tilting of segments 10 can also essentially extend over the entire corresponding dimension of first cap area 12.

The three segments 10 of casing part 4 are of identical shape. As can be seen from FIG. 1B, segments 10 are designed in such a way that, when segments 10 are closed, casing parts 4 of adjacent links 2 overlap with cap areas 12, 14 (only the straight arrangement is shown here) over the entire periphery, apart from residual, design-related gaps. As a result of the spherical shape and sufficient overlapping in longitudinal direction L, casing parts 4 form a closed jacket around guiding ducts 7 and the lines located therein (not shown) in all angular positions.

LIST OF REFERENCE NUMBERS

1 Cable guide
2 Link
3 Inner part
4 Casing part
5 Ball of the ball-and-socket joint
6 Socket of the ball-and-socket joint
7 Guiding duct
10 Segment
12 First cap area
14 Second cap area
20 Web
30 Joint arrangement
32 Joint bracket
33 Slot-like guide
34 Joint area
35 Constriction
36 Opening
40 Snap-in projection
42 Snap-in hook
44 Snap-in edge
45 Projection
L Longitudinal direction

The invention claimed is:

1. Cable guide comprising links that are angle-adjustable multi-axially relative to each other, connected to each other in articulated fashion and arranged successively in the longitudinal direction of the cable guide, wherein each link displays an inner part with corresponding multi-axially angle-adjustable articulation connectors and a casing part for peripheral delimitation of at least one guiding duct, where the casing part encompasses at least one segment, which is connected to the inner part by a web, in a manner permitting it to be pivoted open in order to make an associated guiding duct accessible on the peripheral side, characterised in that the casing parts of adjacent links overlap in the longitudinal direction, and in that a joint arrangement with at least two degrees of freedom is provided between the at least one segment and the web, by means of which the segment can move outwards transversely to the longitudinal direction while being pivoted open.

2. Cable guide according to claim 1, characterised in that the joint arrangement is located on the inside in relation to the casing part.

3. Cable guide according to claim 1, characterised in that the joint arrangement is designed as a combination of two joints, particularly as a rotary and curved guide with a curve direction lying transverse to the axis of rotation, where the axis of rotation is oriented essentially parallel to the longitudinal direction.

4. Cable guide according to claim 3, characterised in that two claw-shaped joint brackets project on one end of the at least one segment, forming a slot-like guide for the curving movement of the rotary and curved guide, and reach in rotating fashion around corresponding joint areas, designed as journals and projecting on the web.

5. Cable guide according to claim 4, characterised in that the slot-like guide runs essentially in the peripheral direction of the casing part and displays a constriction between the two end areas of the guide for locking in two end positions.

6. Cable guide according to claim 1, characterised in that a snap-in projection with a snap-in hook is provided on the end of the segment lying opposite the joint arrangement, engaging the peripherally nearest web on a snap-in edge on the web.

7. Cable guide according to claim 6, characterised in that the snap-in projection reaches into a gap between the two joint brackets of the peripherally nearest segment.

8. Cable guide according to claim 7, characterised in that the joint arrangement, particularly each joint bracket, displays at least one outward-facing opening for detaching the segment from the web, and in that at least one projection is provided on the end of the segment lying opposite the joint arrangement for covering the opening of the peripherally nearest segment.

9. Cable guide according to claim 8, characterised in that the opening is provided in an end area of the joint arrangement that corresponds to the opened end position.

10. Cable guide according to claim 1, characterised in that each segment is divided into two spherical cap areas in the longitudinal direction, where the first cap area displays a centre point of the sphere that essentially coincides with the centre of a ball-and-socket type joint element on the inner part, and the second cap area can at least partially accommodate the first cap area of an adjacent link, and in that the joint arrangement, particularly the rotary and curved guide, is provided exclusively between the first cap area and the web.

11. Cable guide according to claim 10, characterised in that the casing part of each link displays several, particularly three, identical segments, manufactured in one piece, and several, particularly three, webs are integrally moulded on the inner part in one piece in a rotationally symmetrical arrangement, particularly on the middle longitudinal section of the inner part.

12. Cable guide according to claim 11, characterised in that the webs extend radially outwards and with one component in the longitudinal direction.

13. Cable guide according to claim 11, characterised in that parts of the joint arrangement, particularly joint areas designed as journals, are integrally moulded on the outer end of each web, their effective length extending essentially over the entire dimension in the longitudinal direction of the first cap area.

14. Cable guide according to claim 1, characterised in that the casing part is made up of several identical segments, each segment is preferably manufactured in one piece, and each segment can be pivoted open and is designed in such a way that, when the segments are closed, the casing parts of adjacent links reach over each other in all angled positions and essentially over the entire periphery.

15. Cable guide according to claim 1, characterised in that the inner part of each link displays corresponding articulation connectors of the cardan or ball-and-socket joint type that are designed for multi-axially angle-adjustable connection and the absorption of tensile forces.

* * * * *